United States Patent [19]

Valadier

[11] Patent Number: 4,478,093
[45] Date of Patent: Oct. 23, 1984

[54] DYNAMOMETER HAVING A BENDING BEAM

[75] Inventor: Jean-Claude Valadier, Paris, France

[73] Assignee: Testut Aequitas, Paris, France

[21] Appl. No.: 472,447

[22] Filed: Mar. 7, 1983

[30] Foreign Application Priority Data

Mar. 9, 1982 [FR] France ................ 82 03920

[51] Int. Cl.³ ................ G01L 1/22; H01C 10/10
[52] U.S. Cl. ................ 73/862.65; 177/211; 338/5
[58] Field of Search ........... 73/862.65, 774, 767; 177/211; 338/5

[56] References Cited

U.S. PATENT DOCUMENTS 2,544,738  3/1951  Tint .................... 73/862.65
2,761,670  9/1956  Fourtier ................ 338/5 X
3,805,604  4/1974  Ormond ................. 73/862.65 X
3,832,898  9/1974  Randolph, Jr. .......... 338/5 X

FOREIGN PATENT DOCUMENTS 0757211  9/1956  United Kingdom ........... 73/862.65

Primary Examiner—Charles A. Ruehl
Attorney, Agent, or Firm—Cullen, Sloman, Cantor, Grauer, Scott & Rutherford

[57] ABSTRACT

A dynamometer is provided with a testing member having a bending beam. The bending beam has an end embedded in a support and is elastically deformable in bending under the influence of a force Q applied to its opposite end. The dynamometer further comprises a sensor for detecting the deformation of the beam. Anchorage zones are defined in the material of the beam, for receiving four rows of windings of prestressed gauge wire having their principal strands directed approximately perpendicularly to the force Q. The principal strands remain in close contact with the beam in the bending zone. Two of the rows of windings have their principal strands arranged along the tensioned fibres of the beam and the other two have their main strands arranged along the compressed fibres of the beam. The four rows of windings form an electrical bridge assembly.

15 Claims, 21 Drawing Figures

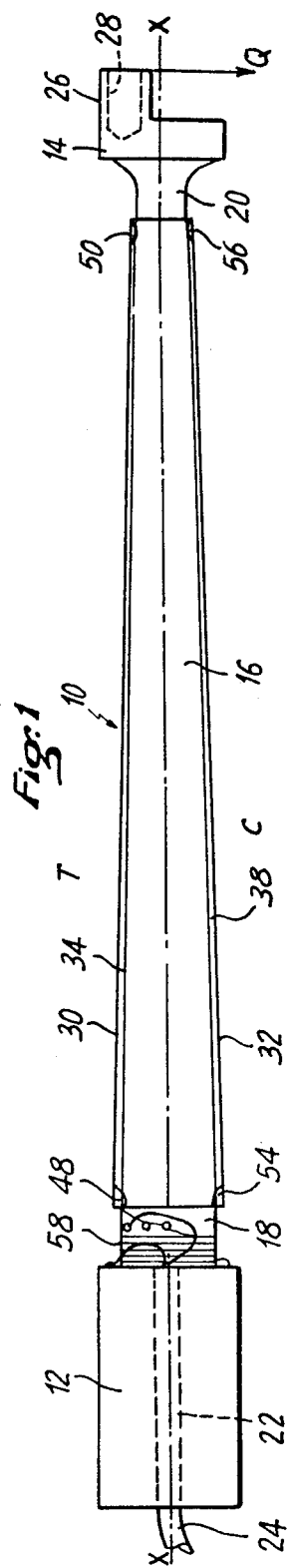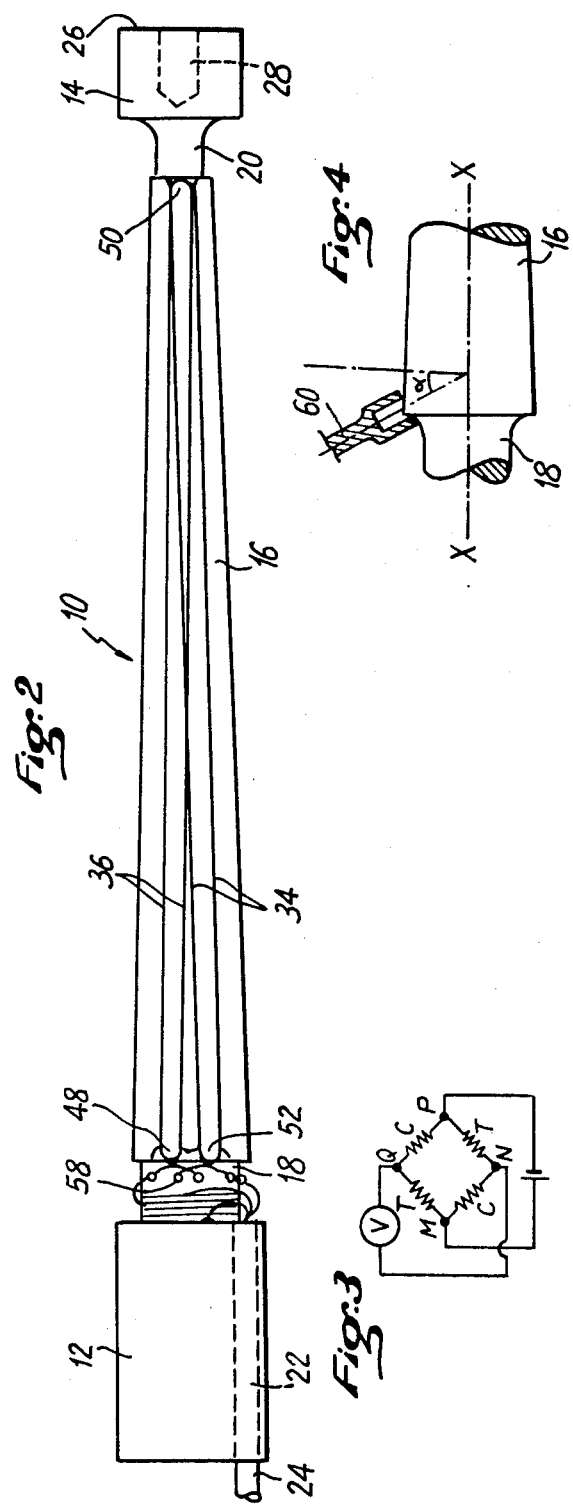

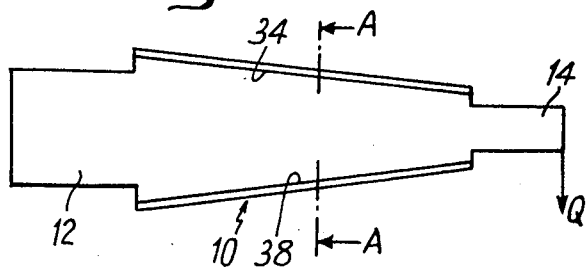
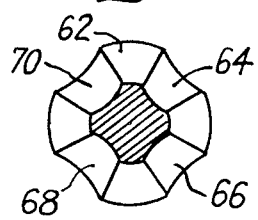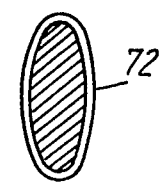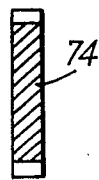
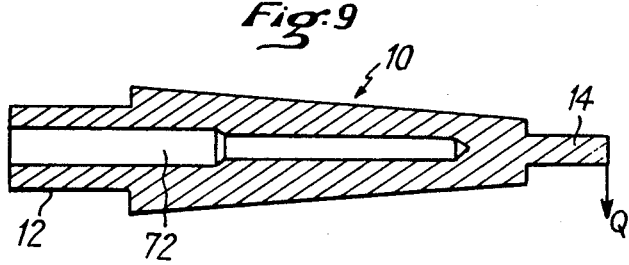
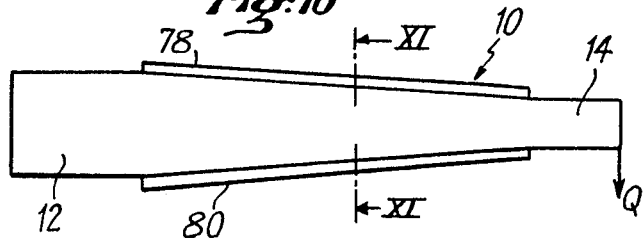
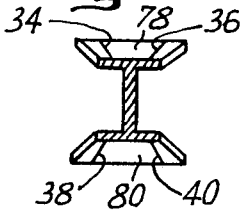

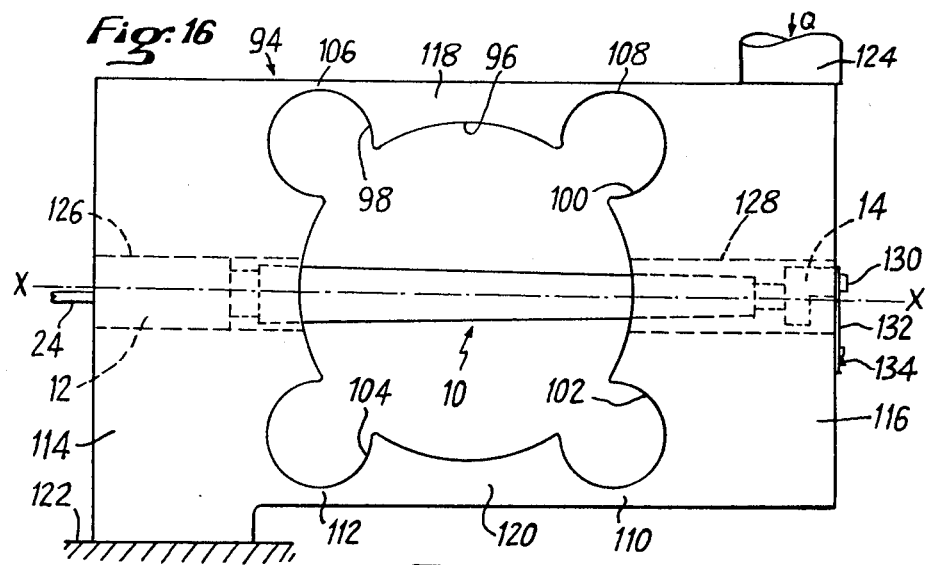
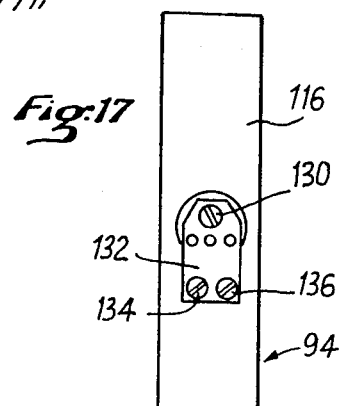
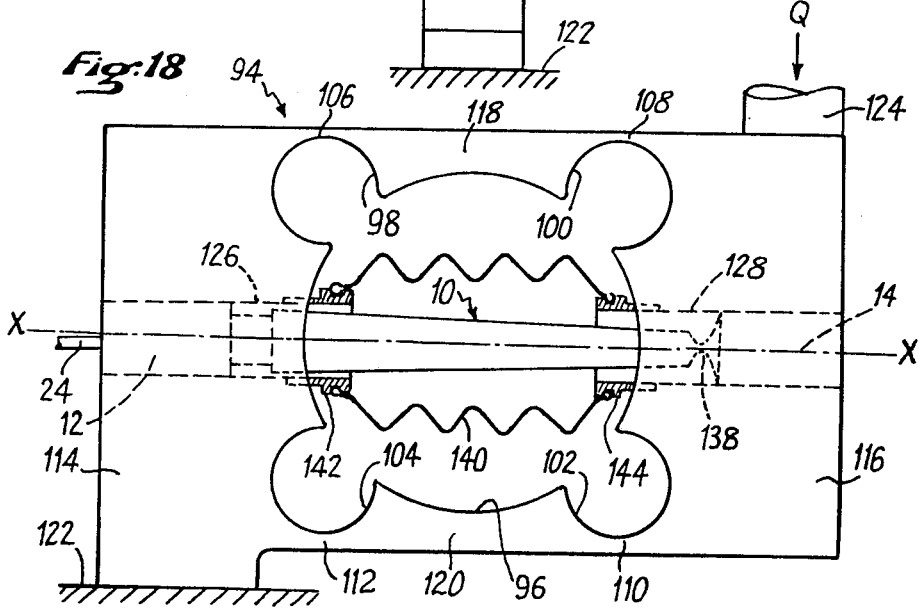

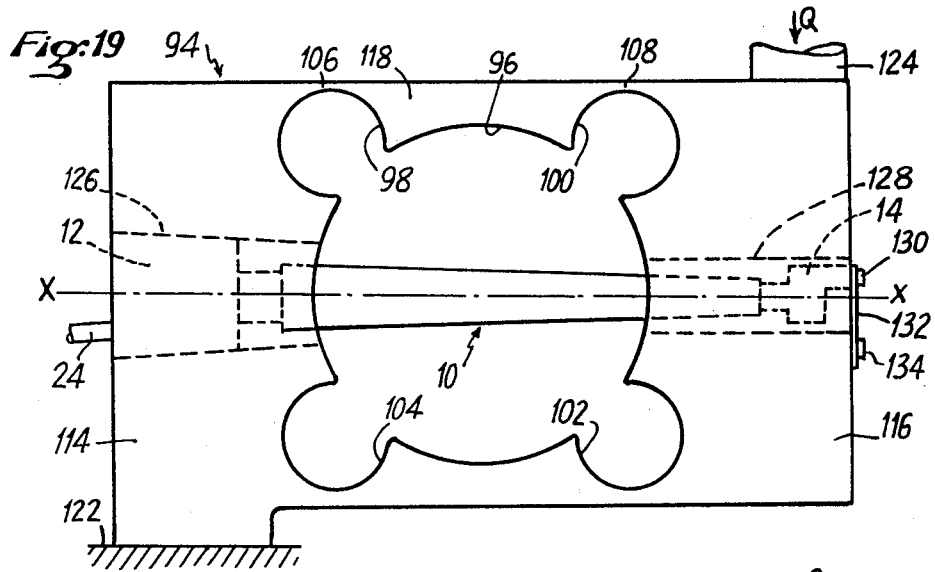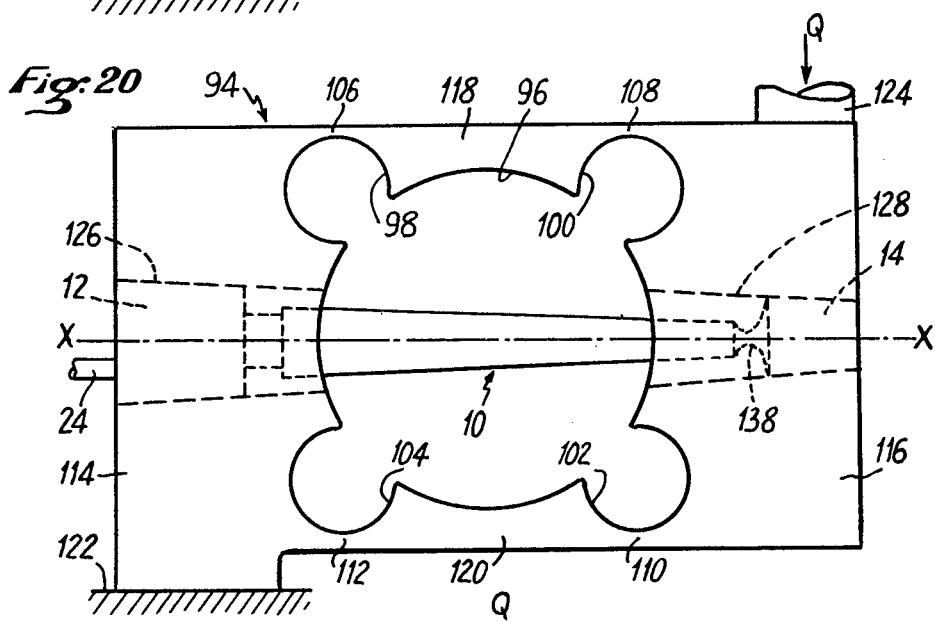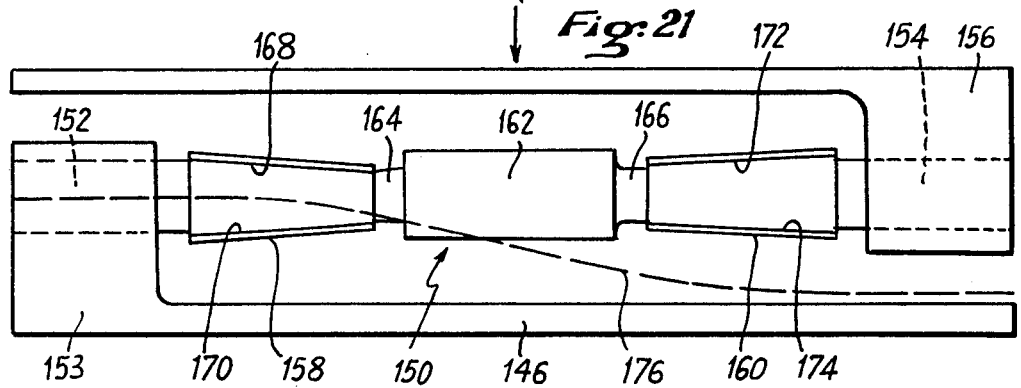

DYNAMOMETER HAVING A BENDING BEAM

BACKGROUND OF THE INVENTION

1. Field of the Invention

The present invention relates to a dynamometer comprising a testing member which is to be subjected to an elastic deformation when a force is applied to it.

It relates more particularly to a dynamometer of the type comprising a testing member having a bending beam which has a built in end and is elastically deformable in bending under the influence of a force applied to the opposite end of the beam, as well as sensing means for detecting the deformation of the beam.

2. Description of the Prior Art

In dynamometers of this type, also known as bending dynamometers, the built-in end of the bending beam, also known as cantilever beam, is fixed to a support, while the load is applied to the opposite end of the beam to enable the beam to bend under the influence of the load applied and then to return elastically to its rest position when the load is removed.

One of the typical uses for bending dynomometers is in suspended balances in which the beam is arranged horizontally with its built-in end fixed to a vertical column and with its opposite end supporting a loadbearing plate.

The known sensing means used in bending dynamometers for detecting the deformation of the beam are usually constituted by gauges comprising a film-like screen of which one of the major disadvantages is that creep occurs under a heavy load.

BRIEF SUMMARY OF THE INVENTION

The object of the present invention is to overcome this disadvantage by producing a bending dynamometer of which the sensing means utilize a resistant wire wound on the testing member.

According to the essential feature of the invention, some anchorage zones are defined in the material of the beam so as to receive four rows of windings of prestressed gauge wire having their principal strands directed approximately perpendicularly to the force applied and remaining in close contact with the beam in the bending zone, two of the rows of windings having their principal strands arranged along the tensioned fibres ofthe beams while the other two have their principal strands arranged along the compressed fibres of the beam, these four rows of windings forming an electrical bridge assembly.

In a preferred embodiment of the invention, the cross-section of the bending zone of the beam tapers from the built-in end to the opposite end.

A truncated cone shape is the preferred shape for the tapering section, particularly since it can very easily be machined. However, other shapes of tapering cross section can be used, in particular milled truncated cone shapes, truncated pyramid shapes with a rectangular, square or rhombus shaped base, shapes have an elliptical cross-section or even shapes having a tapering I cross-section.

The bending zone of the beam can also have a constant cross-section, for example a circular, elliptical, rectangular, square, I-shaped cross-section etc.

In the preferred embodiment of the invention, the anchorage zones are circular shoulders machined into the material of the beam by means of an annular trepan. Each of the four rows of windings is thus supported on two anchorage zones defined in the bending zone of the beam, in the vicinity of the built-in end and in the vicinity of the opposite end respectively. Each anchorage zone is capable of retaining a single row of windings or, if necessary, two rows of windings.

Although each row of windings can comprise a single winding, it is preferable for each one to comprise several rows of windings and for the gauge wire thus to pass several times round the same anchorage zone. In fact, this either enables high bridge resistances to be obtained with the associated, well-known advantages (low consumption and low power to dissipate via the bridge) or allows a reduction in the bending length of the beam for a given resistance, which increases the rigidity of the sensor and simplifies the continuation.

The bending beam of the dynamometer of the invention must be produced from a material having elastic properties, for example from a light alloy such as an aluminium alloy. It is particularly preferable to use an anodizable light alloy as this avoids the problems of electrical insulation between the resistant wire and the material of the testing body.

In a preferred embodiment of the invention, the dynamometer comprises means for fixing the built-in end of the beam and the opposite end of the beam respectively to two opposing arms of a deformable parallelogram having elastic hinges, forming a load receiver.

In such an embodiment, the built-in, end of the beam can be built in one arm of the parallelogram while the opposite end of the beam is connected via a mechanical connection to the opposite arm of the parallelogram. The built-in end and the opposite end of the beam can also be built in two opposite arms of the parallelogram respectively and the beam can comprise a taper which acts as an elastic articulation arranged between the bending zone and the opposite end of the beam.

The dynamometer of the invention can also be used with conventional suspended balances. In balances with a load receiver, the bending beam can comprise two bending zones, each bending zone receiving a row of windings of which the principal strands are arranged along the tensioned fibres of the beam and a row of windings of which the main strands are arranged along the compressed fibres of the beam.

Other features and advantages of the invention will be understood better after reading the following detailed description with reference to the attached drawings given as examples of certain embodiments of the invention.

BRIEF DESCRIPTION OF THE SEVERAL VIEWS OF THE DRAWINGS

FIG. 1 shows an elevation of a dynamometer having a truncated cone shaped bending beam.

FIG. 2 shows a plan view of the dynamometer in FIG. 1.

FIG. 3 shows the electrical bridge assembly of the four rows of windings of the dynamometer in FIGS. 1 and 2

FIG. 4 shows the machining of an anchorage zone by means of an annular trepan.

FIG. 5 shows an elevation illustrating the general shape of a dynamometer with a bending beam of tapering cross-section.

FIGS. 6, 7 and 8 show sectional views along the line AA in FIG. 5 which corresponds to various cross-sectional shapes of the beam.

FIG. 9 is a sectional view of a truncated cone shaped bending beam having a central bore.

FIG. 10 shows an elevational of a bending beam having a tapering I-shaped cross-section.

FIG. 11 shows a sectional view taken along the line XI—XI in FIG. 10.

FIG. 16 shows an elevation of a dynamometer of the invention connected to a load receiver in the form of a deformable parallelogram.

FIG. 17 shows a side view of the dynamometer in FIG. 16.

FIGS. 18 to 20 show elevations of a dynamometer similar to the one in FIG. 16 illustrating various mountings of the built-in end of the beam and of the opposite end of the beam in the deformable parallelogram.

FIG. 21 shows an elevation of a dynamometer according to the invention of which the bending beam comprises two bending zones and is connected to a load receiver such as counter scales or bathroom scales, for example.

DETAILED DESCRIPTION

Figure 12:
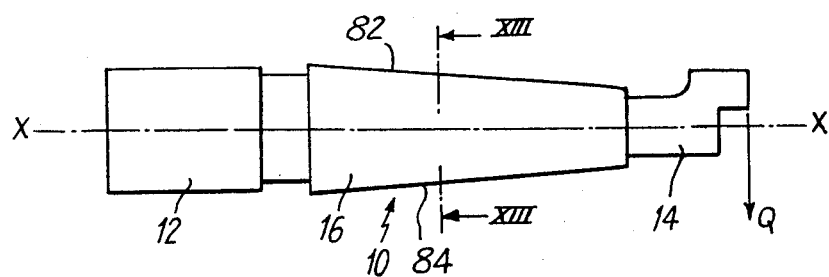
FIG. 12 shows an elevation of a bending beam in the form of a square based truncated pyramid.

FIGS. 1 and 2 show a dynamometer of which the testing member is constituted by a bending beam 10 which has a built-in end 12 and is elastically deformable in bending under the influence of a force Q applied to its opposite end 14. The beam 10 has a bending zone 16 having the shape of a truncated cone comprised between two portions 18 and 20 of tapered cross-section located in the vicinity of the ends 12 and 14 respectively.

The built-in end 12 is cylindrical or is a prism of square cross-section comprising a passage 22 which opens out in the vicinity of the portion 18 and is intended for the introduction of an electrical cable 24 for providing sensing means which will be described below. The opposite end 14 generally assumes the shape of a right prism provided with an extension 26 in which there is made an internally threaded blind hole 28. This blind hole is intended for fixing the end 14 to a support or to a load receiver as described below.

The beam 10 is produced from a material having elastic properties, preferably from an anodizable light alloy.

As the end 12 is built into a suitable support (not shown), the bending zone 16 of the beam 10 tends to bend under the influence of the load Q applied to the end 14. A neutral plane XX which passes through the axis of the truncated cone shaped bending zone and is perpendicular to the direction of the load Q is thus defined in the bending zone. Tensioned fibres located above the neutral plane XX and compressed fibres located below the neutral plane XX are thus also defined. The extreme fibres 30 and 32 which correspond to two opposite generatrices of the truncated cone shaped zone 16 arranged on either side of the plane XX are subjected to the maximum tension and the maximum compression respectively.

The dynamometer shown in FIGS. 1 and 2 also comprises sensing means for detecting the bending deformation of the beam 10. These means comprise, on the one hand, two rows of windings 34 and 36 of prestressed gauge wire having their principal strands directed approximately perpendicularly to the force applied Q and remaining in close contact with the beam 10 in the bending zone 16, the rows of windings 34 and 36 having their principal strands arranged along the tensioned fibres of the bending beam. The sensing means also comprise two rows of windings 38 and 40 of prestressed gauge wire having their principal strands directed approximately perpendicularly to the force applied Q and remaining in close contact with the beam 10 in the bending zone 16, these two rows of windings having their principal strands arranged along the compressed fibres of the beam 10. One of the two rows of windings, that is to say the row of windings 38, is shown in part in FIG. 1.

The above-mentioned rows of windings are supported on the anchorage zones machined in the actual material of the beam 10 and in the vicinity of its built-in end 12 and its opposite end 14 respectively. As shown in FIG. 2, the row of windings 34 is supported on two anchorage zones constituted by two shoulders 52 and 50 machined in the material of the beam 10, in the bending zone 16 in the vicinity of the built-in end 12 and the opposite end 14.

Similarly, the row of windings 36 is supported on an anchorage 48 arranged in the vicinity of the built-in end 22 and on the above-mentioned fixing 50. The fixings 48 and 52 are located in the immediate vicinity and on either side of the generatrix 30 consituting the extreme fibre of the bending beam 10. The rows of windings 34 and 36 can each comprise either a single winding or several windings making it possible either to obtain high bridge resistances or to reduce the bending length of the beam for a given resistance, as already indicated above.

The two rows of windings, such as 38, which are arranged along the compressed fibres of the bending beam 10 are supported on two respective anchorages such as 54 arranged in the immediate vicinity of the built-in end 12 on either side of the generatrix 32 and on a common anchorage 56 arranged in the immediate vicinity of the opposite end 14. These two rows of windings correspond to the rows of windings 34 and 36 but are arranged along the compressed fibres of the beam instead of being arranged along the tensioned fibres of the beam.

The four above-mentioned rows of windings of prestressed gauge wire remaining in close contact with the bending zone 16 are wound continuously round the above-mentioned anchorages and are connected into an electrical bridge assembly of the Wheatstone bridge type as shown in FIG. 3. These four rows of windings are connected to a sensitivity compensation coil 58, arranged around the portion 18, the assembly being supplied with electricity via the cable 24.

The rows of windings 34 and 36 constitute tensioned strands 34 and 36 designated by the letter T in FIG. 3 and, similarly, the other two rows of windings 38 and 40 constitute compressed strands designated by the letter C in FIG. 3. The strands T are located in the opposite arms of the bridge assembly in a similar manner to the strands C.

The bridge assembly, as shown in FIG. 3, constitutes a conventional assembly. It will be remembered that, apart from any load applied to the bending beam 10, the Wheatstone bridge is balanced, that is to say the nominal resistances of the strands T and the strands C are equal. The sandwiched assembly of these four rows of windings allows maximum sensitivity to be achieved when measuring the difference of potential $V_Q-V_N$ which should be zero at rest. Its value, measured for example using a precision voltmeter V, allows measurement of the cumulative variations in the resistances C and T due to the bending elongations induced by the load applied. In practice, a potential difference of 12 volts can be applied to the terminals N and P of the bridge and the voltage $V_Q-V_N$ is measured so as to deduce from it, by prior calibration, the value of the force applied.

The anchorages serving to retain the rows of windings are preferably circular shoulders machined in the actual material of the beam by the method already described in French Patent No. 80 05153 and the first certificate of addition No. 80 13727 belonging to the Applicants.

FIG. 4 shows the machining of such a circular shoulder using a rotating trepan 60 which permits a ring of substance to be removed. This trepan is arranged at an angle α to the normal to the generatrix corresponding to the bending zone 16 so as to form a retaining edge for the row or rows of windings resting on this shoulder. Of course, rows of windings could be held on the fixings more easily by providing adhesive, lacquer or a similar product if desired.

The use of a truncated cone shaped bending zone as shown in FIGS. 1 and 2 has four main advantages.

Firstly, such a shape is ideal for the positioning of the rows of windings on the anchorage zones machined in the actual material of the bending beam.

Secondly, the field of stress is approximately uniform along each wire in the rows of windings.

Furthermore, such a shape provides adequately yielding zones of stress since the measuring wires which necessarily move away from the extreme fibres 30 and 32, have a deformation range slightly below that of these fibres as it depends only on their distance from the neutral plane.

Finally, the ease of machining such a shape should also be emphasised as it can be obtained from a turned part.

It should also be emphasized that the stress field along the generatrices of the truncated cone varies only slightly over the conventional lengths for gauge wires, and the maximum stress can be located between the two ends and towards the middle. This feature is advantageous for the accuracy of the dynamometer as it is always preferable for the fixings of the gauge wire to be pulled only slightly or not at all by the stresses.

The proportions of the truncated cone shaped bending zone can be determined by calculations based on the zone where the stress is to be at a maximum.

As mentioned above, a truncated cone shape is the preferred shape for the bending zone of the beam used in the invention.

Other shapes of bending beams which can be used in the invention will be described below with reference to FIGS. 5 to 15. These shapes are given merely as examples.

FIG. 5 shows a general elevation of a bending beam 10 with its cross-section tapering from the built-in end 12 to the opposite end 14.

As shown in FIG. 6, the bending zone 16 can be a truncated cone shape 62 provided with four areas milled to 45°, 64, 66, 68 and 70.

FIG. 7 shows a bending beam having a tapering elliptical cross-section 72.

FIG. 8 shows a bending beam having a tapering rectangular cross-section 74.

The bending beams shown in FIGS. 5 to 8 can receive two rows of windings such as 34 arranged along the tensioned fibres of the beam and two rows of windings such as 38 arranged along the compressed fibres of the bending beam.

FIG. 9 shows a bending beam having a truncated cone shaped bending zone which is provided with an axial bore 76 so as either to increase the sensitivity of the sensor towards a given external shape or to allow adjustment of the sensitivity by abrasion inside the hole, for example using a round file, without any risk to the rows of windings wound outside the bending beam. Of course, such an axial bore can be produced in other shapes of beams, whether they are of tapering cross-section or of constant cross-section.

FIGS. 10 and 11 show another embodiment of a bending beam of which the bending zone has a tapering cross-section. In this particular example, the cross-section is I-shaped. The two opposite wings 78 and 80 of the I-shaped beam enable the four rows of windings of prestressed gauge wire to be positioned. The wing 78 thus receives the two rows of windings 34 and 36 of which the principal strands constitute the tensioned strands and the wing 80 receives the two rows of windings 38 and 40 of which the principal strands constitute the compressed strands. It should be noted that bending beams of the I beam type are advantageous for the range of the signal from the dynamometer while affording the same opportunities as the other above-mentioned shapes for the winding of the resistant wires. Moreover, such a shape permits a clear saving to be made in materials, the web of the I being sufficient to resist the stress located in its plane.

Figure 13:
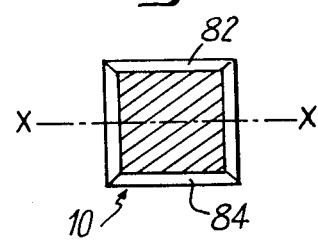
FIG. 13 shows a sectional view taken along the line XIII—XIII in FIG. 12.

FIGS. 12 and 13 show a bending beam 10 of which the bending zone 16 has the shape of a rectangular based truncated pyramid. Two of the sides, that is the sides 82 and 84, of the base are directed parallel to the neutral plane XX of the beam.

Figure 14:
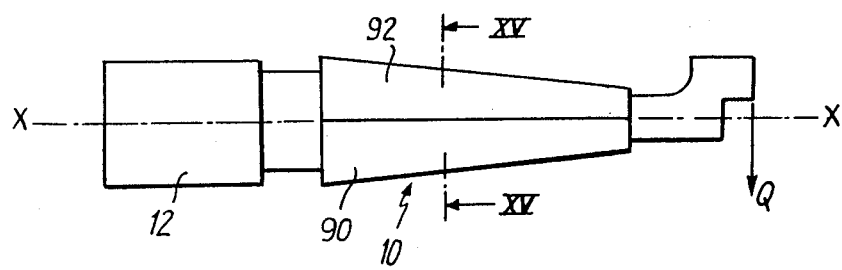
FIG. 14 shows an elevation of another bending beam having the shape of a square based truncated pyramid.
Figure 15:
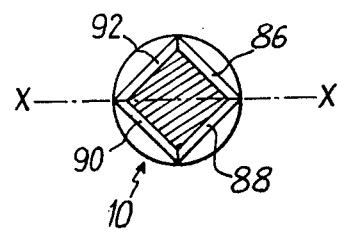
FIG. 15 shows a sectional view taken along the line XI-XV in FIG. 14.

FIGS. 14 and 15 show another embodiment of a bending beam of which the bending zone has a truncated pyramid shape. This truncated pyramid has a square base of which the sides 86, 88, 90 and 92 are directed at 45° to the neutral plane XX of the beam. This beam could also have a rhombus-shaped base.

Shapes of bending zone having tapering cross-sections have been described above, but bending zones having a constant cross-section can also be produced, and the said cross-section can be circular, oval, square, I-shaped etc., as before.

FIGS. 16 and 17 show the assembly of a dynamometer with a bending beam 10 according to the invention in a deformable parallelogram-shaped load receiver 94 of a type known per se.

The load receiver 94 has a general parallel-piped shaped produced from an elastically deformable material, this shape being provided with a circular orifice 96 of a large diameter and with four circular orifices 98, 100, 102 and 104 of small diameter produced at the periphery of the orifice 96. Four elastic hinges 106, 108, 110 and 112 are thus produced at the four peaks of a deformable parallelogram. This deformable parallelogram comprises two opposing arms 114 and 116 and two opposing arms 118 and 120. The load receiver 94 is fixed on a base 122 and also receives a plate support 124 intended to receive a load Q.

The bending beam 10 of which the bending zone can be truncated cone shaped, for example, is mounted in such a way that its end 12 is built into the arm 114 of the deformable parallelogram and its end 14 is mechanically connected to the opposing arm 116 of the deformable parallelogram. The built-in end 12 is mechanically gripped, stuck, welded or screwed in a traversing orifice 126 made through the arm 114 of the parallelogram, and the opposing end of the bending beam passes into an orifice 128 of larger size made in the opposing arm 116. As shown more clearly in FIG. 17, the end 14 of the bending beam 10 is fixed by means of a screw 130 introduced into the blind hole 28 (cf. FIG. 1) to an elastic plate 132 which is in turn fixed by two screws 134 and 136 to the opposing arm 116 of the deformable parallelogram. It will thus be understood that, under the influence of the load Q applied to the load receiving plate 94, the parallelogram is deformed about its four articulations and the beam 10 bends under the influence of the load Q. The value of the load is determined, as before, by means of the bridge assembly.

FIG. 18 shows a design which is substantially the same as the one in FIGS. 16 and 17, but which differs from it mainly in that the opposite end 14 is also built into the orifices 128. The beam 10 thus comprises a taper 138 arranged between the bending zone 16 and the opposite end 14 and acting as an elastic articulation. The end 14, like the end 12, can be gripped, stuck, screwed, or welded in the orifice 128.

The dynamometer shown in FIG. 18 also comprises a protective concertina sleeve 140 surrounding the bending zone 16 of the beam 10. The sleeve 140 is fixed at its two end to two rings 142 and 144 which are in turn screwed or stuck respectively in the orifices 126 and 128. The sleeve 140 and the two rings 142 and 144 are shown in half section in FIG. 18.

FIG. 19 shows another variation which is similar to the one in FIGS. 16 and 17. In this embodiment, the built-in end 12 is conical and is slipped into a matching conical orifice 126. The opposite end 14 is connected to the arm 116 of the deformable parallelogram by an elastic plate 132 as in FIGS. 16 and 17.

FIG. 20 shows an alternative assembly in which the ends 12 and 14 are both truncated cone shaped and are slipped in matching truncated cone shaped orifices 126 and 128. The bending beam 10 thus comprises a taper 138 similar to the one shown in FIG. 18, arranged between the bending zone 16 and the opposite end 14.

It is obvious that the dynamometers in FIGS. 16 to 20 can receive any bending beam of decreasing or constant cross-section, as mentioned above. Moreover, the sleeve 140 shown in FIG. 18 can be connected to the dynamometers in FIGS. 19 and 20 just as they are the dynamometers in FIGS. 16 and 17.

The mounting of the dynamometer of the invention in a deformable parallelogram shaped load receiver enables the load receiver to benefit from the low cost and the resistance to creep of the bending beam according to the invention. The actual load receiver can be produced from a metal which has elastic properties but differs from the metal constituting the bending beam.

FIG. 21 shows a load receiver of the bathroom scales type comprising a base 146, a load bearing plate 148 and a bending beam 150 which has one end 152 fixed in a vertical extension 153 of the base 146 and an opposite end 154 fixed in a vertical extension 156 of the plate 148.

The bending beam 150 comprises two bending zones 158 and 160, both of which are truncated cone shaped and arranged opposite each other. The zones 158 and 160 are separated by a cylindrical cross-section 162 and by two reduced cross-sections 164 and 166. The bending zones 158 and 160 comprise anchorage zones and receive rows of windings of gauge wire. The beam 158 thus receives a row of windings 168 of which the principal strands are arranged along the tensioned fibres of the beam and a row of windings 170 of which the principal strands are arranged along the compressed fibres of the beam. Similarly, the bending zone 160 receives a row of windings 172 of which the main strands are arranged along the compressed fibres of the beam and a row of windings 174 of which the main strands are arranged along the tensioned fibres of the beam. The rows of windings 168, 170, 172 and 174 are mounted in an electrical bridge assembly similar to the one shown in FIG. 3. The rows of windings 168 and 174 form two opposite arms of the bridge whereas the rows of windings 170 and 172 form the other two opposite arms of the bridge.

Under the influence of the load Q applied to the plate 148, the beam bends and is deformed, as shown by the broken line 176 which illustrates the deformation under load of the bending beam. The two bending zones 158 and 160 of the bending beam 160 can be zones of diminishing cross-section or of constant cross-section, as described above.

The invention is not limited to the embodiment described in particular and illustrated, and other variations can be envisaged without departing from the scope of the invention.

Thus, if the bending beam is mounted in a deformable parallelogram, the beam can be arranged vertically between the two horizontal arms of the parallelogram, the other two arms of the parallelogram being inclined to the vertical.

Moreover, the mechanical connection possibly used for connecting the opposing end of the beam to an arm of the parallelogram can be not only an elastic strip, for example a steel strip, but also a rod-type linkage with blades and needles, or again a wire or a cable.

It will be preferable to use enamelled gauge wire even if the beam is produced from an anodizable alloy.

The dynamometer of the invention permits the production of a varied range of industrial dynamometers and of weighing articles, in particular bathroom scales.

What I claim is:

1. A dynamometer comprising a testing member having a bending beam which has a built-in end and which is elastically deformable in bending under the influence of a force Q applied to its opposite end;
   sensing means for detecting the deformation of the beam;
   said sensing means comprising four rows of windings of prestressed gauge wire attached upon anchorage zones defined in the material of the beam;
   the windings having their principal strands directed approximately perpendicularly to said force Q and remaining in close contact with the beam in the bending zone;
   two of the rows of windings having their principal strands arranged along the tensioned fibres of the beam, the other two rows of windings having their principal strands arranged along the compressed fibres of the beam;

the four rows of windings forming an electrical bridge assembly.

2. A dynamometer according to claim 1, wherein the bending zone of the beam has a cross-section which tapers from the built-in end to the opposite end.

3. A dynamometer according to claim 2, wherein the bending zone of the beam has a truncated cone shape.

4. A dynamometer according to claim 2, wherein the bending zone of the beam has a truncated pyramid shape.

5. A dynamometer according to claim 4, wherein the truncated pyramid has a rectangular base and two opposing sides of the base are directed parallel to the neutral plane of the beam.

6. A dynamometer according to claim 4, wherein the truncated pyramid has a square base and the sides of the base are directed at 45° to the neutral plane of the beam.

7. A dynamometer according to claim 2, wherein the bending zone of the beam has a tapering I-shaped cross-section.

8. A dynamometer according to claim 1, wherein the bending zone of the beam has a constant cross-section.

9. A dynamometer according to claim 1, wherein the bending beam has an axial bore.

10. A dynamometer according to claim 1, wherein the anchorage zones are circular shoulders machined in the material of the beam using an annular trepan.

11. A dynamometer according to claim 1, wherein the beam is produced from an anodizable light alloy.

12. A dynamometer according to claim 1, further comprising means for fixing the built-in end of the beam and the opposite end of the beam to two respective opposing arms of a deformable parallelogram with elastic hinges forming a load receiver.

13. A dynamometer according to claim 12, wherein the built-in end of the beam is fixed into an arm of the parallelogram while the opposite end of the beam is connected by a mechanical connection to the opposite arm of the parallelogram.

14. A dynamometer according to claim 12, wherein the built-in end and the opposite end of the beam are fixed in two respective opposing arms of the parallelogram and the beam comprises a taper acting as an elastic joint arranged between the bending zone and the opposite end of the beam.

15. A dynamometer according to claim 1, wherein the bending beam comprises two bending zones, each bending zone receiving a row of windings of which the principal strands are arranged along the tensioned fibres of the beam and a row of windings of which the principal strands are arranged along the compressed fibres of the beam.

* * * * *